(12) United States Patent
Lebowsky (10) Patent No.: US 9,386,190 B2
(45) Date of Patent: Jul. 5, 2016

(54) METHOD AND DEVICE FOR COMPRESSION OF AN IMAGE SIGNAL AND CORRESPONDING DECOMPRESSION METHOD AND DEVICE

(71) Applicant: STMicroelectronics (Grenoble 2) SAS, Grenoble (FR)

(72) Inventor: Fritz Lebowsky, St. Martin d'Uriage (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 14/811,531

(22) Filed: Jul. 28, 2015

(65) Prior Publication Data
US 2015/0334268 A1 Nov. 19, 2015

Related U.S. Application Data

(63) Continuation-in-part of application No. PCT/EP2014/051580, filed on Jan. 28, 2014.

(30) Foreign Application Priority Data

Jan. 29, 2013 (FR) ..................... 13 50718

(51) Int. Cl.
*G06K 9/00* (2006.01)
*H04N 1/64* (2006.01)
(Continued)

(52) U.S. Cl.
CPC *H04N 1/64* (2013.01); *G06T 7/408* (2013.01); *H04N 19/176* (2014.11); *H04N 19/182* (2014.11); *H04N 19/186* (2014.11); *H04N 19/46* (2014.11); *H04N 19/593* (2014.11); *H04N 19/88* (2014.11); *H04N 19/436* (2014.11); *H04N 19/94* (2014.11)

(58) Field of Classification Search
CPC . H04N 7/50; H04N 7/26244; H04N 7/26313; H04N 7/30; H04N 7/26335; H04N 7/26079; H04N 1/64; H04N 7/26292; H04N 7/26148; G06T 9/005
See application file for complete search history.

(56) References Cited

U.S. PATENT DOCUMENTS 6,108,381 A 8/2000 Pau et al.
2006/0182350 A1 8/2006 Kondo et al.

OTHER PUBLICATIONS

Bruni et al., "A Novel Adaptive Vector Quantization Method for Memory Reduction in MPEG-2 HDTV Decoders," *IEEE Transactions on Consumer Electronics* 44(3):537-544, Aug. 1998.

(Continued)

*Primary Examiner* — Duy M Dang
(74) *Attorney, Agent, or Firm* — Seed IP Law Group PLLC (57) ABSTRACT

A method compresses, into a compressed image signal, an initial image signal including a sequence of pixels having respective amplitudes of plural digital color components. The method includes, for each color component, subdividing the sequence into several groups of several adjacent pixels, and for each group of a portion of the groups, generating a sequenced set of pixels for the group by a monotone sequencing of the pixels of the group as a function of amplitudes of the color component, and approximating amplitudes of the color component of the pixels of the set by a monotone approximation function with one variable related to positions of the pixels in the set. The compressed image signal includes indications of position of the sequenced pixels in the group and characteristics of the approximation function associated with that group.

26 Claims, 7 Drawing Sheets

(51) Int. Cl.

| | |
|---|---|
| *G06T 7/40* | (2006.01) |
| *H04N 19/182* | (2014.01) |
| *H04N 19/176* | (2014.01) |
| *H04N 19/46* | (2014.01) |
| *H04N 19/593* | (2014.01) |
| *H04N 19/186* | (2014.01) |
| *H04N 19/88* | (2014.01) |
| *H04N 19/436* | (2014.01) |
| *H04N 19/94* | (2014.01) |

(56) References Cited

OTHER PUBLICATIONS

Hong et al., "Multiscale Hybrid Linear Models for Lossy Image Representation," *IEEE Transactions on Image Processing* 15(12):3655-3671, Dec. 2006.

Hua et al., "Inertia: a New Force Field for Geometric Active Contour," 2008 American Control Conference, Jun. 11-13, 2008, Seattle, WA, 6 pages.

Lebowsky et al., "Color discrimination problems in digital TV systems," Color Imaging X: Processing, Hardcopy, and Applications, San Jose, CA, Jan. 17, 2005, 11 pages.

Lebowsky et al., "Optimizing color edge contrast in presence of noise and amplitude quantization errors," Color Imaging XII: Processing, Hardcopy, and Applications, San Jose, CA, Jan. 28, 2007, 11 pages.

Lebowsky et al., "Perceptual image quality improvement for large screen displays," Human Vision and Electronic Imaging XI, San Jose, CA, Jan. 15, 2006, pp. 203-212, 2006.

Ng et al., "Surface-from-Gradients without Discrete Integrability Enforcement: A Gaussian Kernel Approach," *IEEE Transactions on Pattern Analysis and Machine Intelligence* 32(11):2085-2100, Nov. 2010.

Pan et al., "3D Video Disparity Scaling for Preference and Prevention of Discomfort," Stereoscopic Displays and Applications XXII, South San Francisco, CA, Jan. 24-27, 2011, 8 pages.

Roberts, "Picture Coding Using Pseudo-Random Noise," *IRE Transactions on Information Theory* 8(2):145-154, Feb. 1962.

Somkantha et al., "Boundary Detection in Medical Images Using Edge Following Algorithm Based on Intensity Gradient and Texture Gradient Features," *IEEE Transactions on Biomedical Engineering* 58(3):567-573, Mar. 2011.

Tasdizen, "Principal Neighborhood Dictionaries for Nonlocal Means Image Denoising," *IEEE Transactions on Image Processing* 18(12):2649-2660, Dec. 2009.

Wallace, "The JPEG Still Picture Compression Standard," *IEEE Transactions on Consumer Electronics* 38(1):xviii-xxxiv, Feb. 1992.

METHOD AND DEVICE FOR COMPRESSION OF AN IMAGE SIGNAL AND CORRESPONDING DECOMPRESSION METHOD AND DEVICE

BACKGROUND

1. Technical Field

The disclosure relates to the compression of digital data and, more particularly, to the compression of an image signal.

2. Description of the Related Art

Generally, in the image processing context, an image frame to be displayed on a screen, for example the screen of a television set, is represented by a matrix structure of digital information representing a grid of pixels and with each pixel there are associated several color components, for example the brightness Y and chrominance Cr and Cb components, each having a level or amplitude for the pixel in question. Such a structure of pixels, or "bitmap" therefore corresponds bit by bit or pixel by pixel to the image (the term "raster" image is used) to be displayed on the screen. Moreover, in general the structure of pixels is generally in the same format as that used for the storage in the video memory of the screen. Moreover, the raster frame thus stored in the video memory will be read pixel by pixel on a line and line by line. This is referred to as a "raster scan".

At present, the size of the frames used for digital high definition television, called HDTV, is the so-called "2 k1 k" size, that is to say comprising 1080 lines of 1920 pixels. Moreover, the frequency, that is to say the number of frames per second, is 60 Hz.

In order to transmit such an image signal provided by the TV decoder, over the wire link connecting that decoder to the television set, it is desirable to carry out a compression of the image signal provided by the decoder. In fact, transmitting such an image signal without compression normally would employ extremely high transfer speeds which are generally costly and create electromagnetic interference.

That is the reason why a compression of the signal provided by the decoder is carried out.

At present, a conventional compression of such a signal can be carried out by applying a two-dimensional low-pass filter to the chrominance components of the image signal. However, even if the quality of the image finally displayed on the screen remains acceptable, high frequency information of the image signal can be lost.

Moreover, when it is desired to apply such a compression to an image frame this time having a "4 k2 k" size, that is to say 3840 pixels per line on 2160 lines, the video part of the image remains acceptable, with the abovementioned disadvantages, but on the other hand the graphics and the colored texts are degraded (vague colors and contrast reduction).

Furthermore, applying such compression on an even bigger frame size, for example "8k4k", becomes increasingly problematic.

BRIEF SUMMARY

According to one implementation and embodiment, there is consequently proposed a compression/decompression method and device making it possible to reduce the visible degradations of the displayed image.

According to one implementation and embodiment, it is also proposed to reduce the data transfer rate (measured in bits per second), for example by a factor of 2, without compromising the visual quality of the image on the screen whilst reducing the processing power (measured in operations per pixel) at every stage of processing the image.

According to one embodiment, there is proposed a method for the compression of an initial image signal into a compressed image signal.

The initial image signal comprises a sequence of pixels. Each pixel is allocated with several digital color components, for example the Y, Cr, Cb components, or the R, G, B components. For each color component, the method comprises:

a subdivision of the sequence of pixels into several groups of adjacent pixels, a generation of a sequenced set of pixels associated with the group, this generation comprising a monotone sequencing of the pixels of each group as a function of the amplitude of their color component, an approximation of the amplitudes of the color component of the pixels of the set by a monotone approximation function with one variable related to the position of the sequenced pixels in the set, the compressed image signal then comprises, for each color component and for each group of pixels, an item of information or vector comprising indications of position of the sequenced pixels in the group, as well as the characteristics of the approximation function associated with that group.

The sequence of pixels can be a complete frame of the image or a macroblock, for example of 64×64 pixels, of the image, the macroblocks then arriving sequentially. The sequence of pixels can also be understood as being a succession of pixels of the frame of the image, these pixels arriving sequentially and line by line, according to the "raster" format.

In practice, the groups of the part upon which the generation of the sequenced set of pixels and the approximation are carried out are the groups of which at least two amplitudes of the color component in question are different.

In fact, according to one implementation, for a group of which all the amplitudes of the color component in question are identical, the compressed image signal then comprises an item of information containing an indication of the value of that amplitude.

According to this aspect, provision is therefore made to carry out a functional compression which results in a compressed signal containing hierarchically structured information of the image signal using a subdivision of the image into groups, each group being represented by indications of position in the group, pixels sequenced according to their associated color component amplitude, the amplitudes themselves being represented by the characteristics of a monotone approximation function.

In order to further improve the quality of the image reconstituted after decompression, the method advantageously comprises an adjustment of the characteristics of the approximation function associated with the sequenced set in question in such a way as to minimize the mean error between the color component amplitudes in question allocated to the pixels of the set and the approximated amplitudes of that color component.

Even though it is possible to use different functions for different sets of sequenced pixels, it is simpler to choose an approximation function which is a function that can be parameterized, the values of the parameters then being adjusted for each set according to the values of the amplitudes of the color component in question allocated to the pixels of the set. The characteristics of the approximation function therefore include the parameters.

The approximation function can comprise at least a monotone polynomial function for example a set of linear functions (slopes).

In order to reduce the risk of appearance of color banding phenomena in the reconstituted image, which can be annoying in certain applications, the generation of the sequenced set of pixels associated with the group can advantageously comprise a normalization of the amplitudes of the color component in question allocated to the pixels of the group. In this case, the information of the compressed signal, associated with the group, furthermore comprises the minimum value and the maximum value of the amplitudes.

In order to spread the quantification error over the whole of the displayed image and thus to reduce the risk of appearance of local defects in the image, it is particularly advantageous for the generation of the sequenced set of pixels associated with the group to furthermore comprise the addition of pseudo-random noise on the amplitude of the color component in question allocated to the pixels of the group, or on the normalized amplitudes.

In fact, this addition of pseudo-random noise can be carried out before or after a possible normalization of the values of the amplitudes.

The shape of the adjacent groups of pixels can be any shape whatsoever. A group can for example be a segment of several pixels, or a zone comprising several adjacent pixels spread over several adjacent lines. A zone can thus be a rectangle of N×M pixels, N and M being able to be of any value. In practice, and in order to be perfectly compatible with the storage in a memory, each group of pixels can be a zone of $2^p \times 2^{pv}$ adjacent pixels of the matrix of pixels of the sequence of pixels, p and pv being integers which can be different or equal.

In order to further limit the number of bits for encoding the position indications of the sequenced pixels in the group, and also to decorrelate the quantification errors, it is possible to envisage a subdivision of the groups of pixels into sub-groups of pixels and an application of the steps of generation of a sequenced set and of approximation on at least a portion of the sub-groups, in practice those of which at least two amplitudes of the color component in question are different. Here again, if the color component of the pixels of a sub-group is uniform over that sub-group, these steps of generation of sequenced sets and of approximation are not applied and simply the amplitude of the color component of the pixels of that sub-group will be transmitted in the compressed signal.

Furthermore, the information of the compressed signal comprises for each sub-group an indication of the shape of the sub-group in the group (for example a checkered pattern).

According to another aspect, there is proposed a method for the decompression of an image signal compressed according to the compression method as defined above, the decompression method comprising, for each color component and for each group of pixels, a determination of the amplitude of the color component of the pixels from the associated information.

More precisely, this determination of the amplitude of the color component of the pixels comprises a calculation of the approximated values of the amplitudes of the color component for the pixels of the corresponding sequenced set from the approximation function and an allocation of these calculated approximated values to the corresponding pixels of the group on the basis of the position indications, and possibly a rescaling of these values if a normalization has been carried out during the compression.

According to another aspect, there is proposed a device for the compression of an initial image signal into a compressed image signal, comprising:

an input for receiving the initial image signal comprising a sequence of pixels, each pixel being allocated with several digital color components, a processor configured, for each color component, to:

carry out a subdivision of the sequence of pixels into several groups of several adjacent pixels, and for each group of at least one portion of the groups:

generate a sequenced set of pixels associated with the group from a monotone sequencing of the pixels of each group according to the amplitude of their color component, and carry out an approximation of the amplitudes of the color component of the pixels of the set by a monotone approximation function with one variable related to the positions of the sequenced pixels in the set, an output for delivering the compressed image signal comprising for each color component and for each group of pixels belonging to the at least one portion, information comprising indications of position of the sequenced pixels in the group and the characteristics of the approximation function associated with that group.

According to one embodiment, the processor is furthermore configured to carry out an adjustment of the characteristics of the approximation function associated with the set in question in order to minimize the mean error between the amplitudes of the color component in question allocated to the pixels of the set and the approximated amplitudes of that color component.

According to one embodiment, the approximation function is a function that can be parameterized and the processor is configured to adjust the values of the parameters for each set as a function of the values of the amplitudes of the color component in question allocated to the pixels of the set, the characteristics of the approximation function comprising the parameters.

According to one embodiment, the processor is furthermore configured, in the generation of the sequenced set of pixels associated with the group, to carry out a normalization of the amplitudes of the color component in question allocated to the pixels of the group and the information associated with the group furthermore comprises the minimum value and the maximum value of the amplitudes.

According to one embodiment, the processor is furthermore configured, in the generation of the sequenced set of pixels associated with the group, to add pseudo-random noise to the amplitudes of the color component in question allocated to the pixels of the group or to the normalized amplitudes.

According to one embodiment the processor is furthermore configured to carry out a subdivision of each group of pixels into sub-groups of pixels, and to generate a sequenced set and of approximation to at least a portion of the sub-groups, the information of the compressed signal furthermore comprising an indication of the shape of each subgroup.

According to another aspect, there is proposed a device for the decompression of an image signal compressed by the compression device as defined above, the decompression device comprising processing means configured, for each color component and for each group of pixels, to determine the amplitude of the color component of the pixels from the associated information.

More particularly, the processor is configured, during the determination, to carry out a calculation of the approximated values of the amplitudes of the color component for the pixels of the corresponding sequenced set from the approximation function and to allocate these calculated approximated values to the corresponding pixels of the group from the position indications, and possibly to carry out a rescaling of these values if a normalization was carried out during the compression.

According to another aspect, there is proposed a computer program product that can be directly loaded into a memory of a data processing system, for example a processor, comprising portions of software code for the execution of the compression method or of the decompression method as defined above when the program is executed on the data processing system.

According to another aspect, there is proposed a medium, for example a program memory, that can be read by a data processing system, such as a processor, having instructions that can be executed by a computer adapted to cause the execution by the data processing system of the compression method or the decompression method such as defined above.

According to another aspect, there is proposed a compressed image signal, representing an initial image signal comprising a sequence of pixels, each pixel being allocated with several digital color components, the compressed image signal comprising a plurality of items of information, each item of information being associated with a color component and with a group of pixels of the sequence and containing indications of position in the group, of the pixels sequenced, for example in an increasing monotone or in a decreasing monotone manner, according to their amplitude of the color component and characteristics of an approximation function, for example increasing monotone or decreasing monotone, associated with that group and making it possible to determine for each of the pixels an approximated amplitude of the color component from their position.

In the case where a group of pixels is subdivided into sub-groups of pixels, the compressed signal information associated with a color component and with a sub-group of pixels can contain indications of position in the sub-group, of the sequenced pixels according to their amplitude of the color component, an indication of the shape of the sub-group, and characteristics of an approximation function associated with that sub-group and making it possible to determine for each of the pixels an approximated amplitude of the color component from their position.

In other cases, the compressed signal information associated with a group or with a sub-group can contain an amplitude value of the corresponding color component, valid for all of the pixels of the group or of the sub-group.

In the case where information associated with a group or with a sub-group comprises normalized amplitudes, for example included between 0 and 1, the information can furthermore comprise a minimum value and a maximum value of amplitude, intended to allow a rescaling of the amplitudes.

According to another aspect, there is proposed a compressed image signal, capable of generating a reconstituted image signal notably for the purpose of displaying an image, comprising a sequence of pixels, each pixel being allocated with several digital color components, the compressed image signal comprising a plurality of items of information, each item of information being associated with a color component and with a group of pixels of the sequence and containing indications of position in the group, of the sequenced pixels, for example in an increasing monotone or a decreasing monotone manner, according to their amplitude of the color component and characteristics of an approximation function, for example an increasing monotone or a decreasing monotone function, associated with that group and making it possible to determine for each of the pixels, from their position, an approximated amplitude of the color component in the reconstituted image.

In the case where a group of pixels is subdivided into sub-groups of pixels, the information of the compressed signal associated with a color component and with a sub-group of pixels can contain indications of position in the sub-group, pixels sequenced according to their amplitude of the color component, an indication of the shape of the sub-group, and characteristics of an approximation function associated with that sub-group and making it possible to determine for each of the pixels an approximated amplitude of the color component in the compressed image signal, from their position.

In other cases, the compressed signal information associated with a group or a sub-group can contain a value of the amplitude of the corresponding color component in the reconstituted image signal, valid for all of the pixels of the group or of the sub-group.

In the case where information associated with a group or a sub-group comprises normalized amplitudes, for example included between 0 and 1, the information can furthermore comprise a minimum value and a maximum value of amplitude, intended to allow a rescaling of the amplitudes in the reconstituted image signal.

BRIEF DESCRIPTION OF THE SEVERAL VIEWS OF THE DRAWINGS

Other advantages and features of the disclosure will become apparent on examination of the detailed description of implementations and embodiments, which is in no way limiting, and of FIGS. 1 to 12 which diagrammatically illustrate different implementations and embodiments of the methods and devices according to the disclosure.

DETAILED DESCRIPTION

Figure 1:
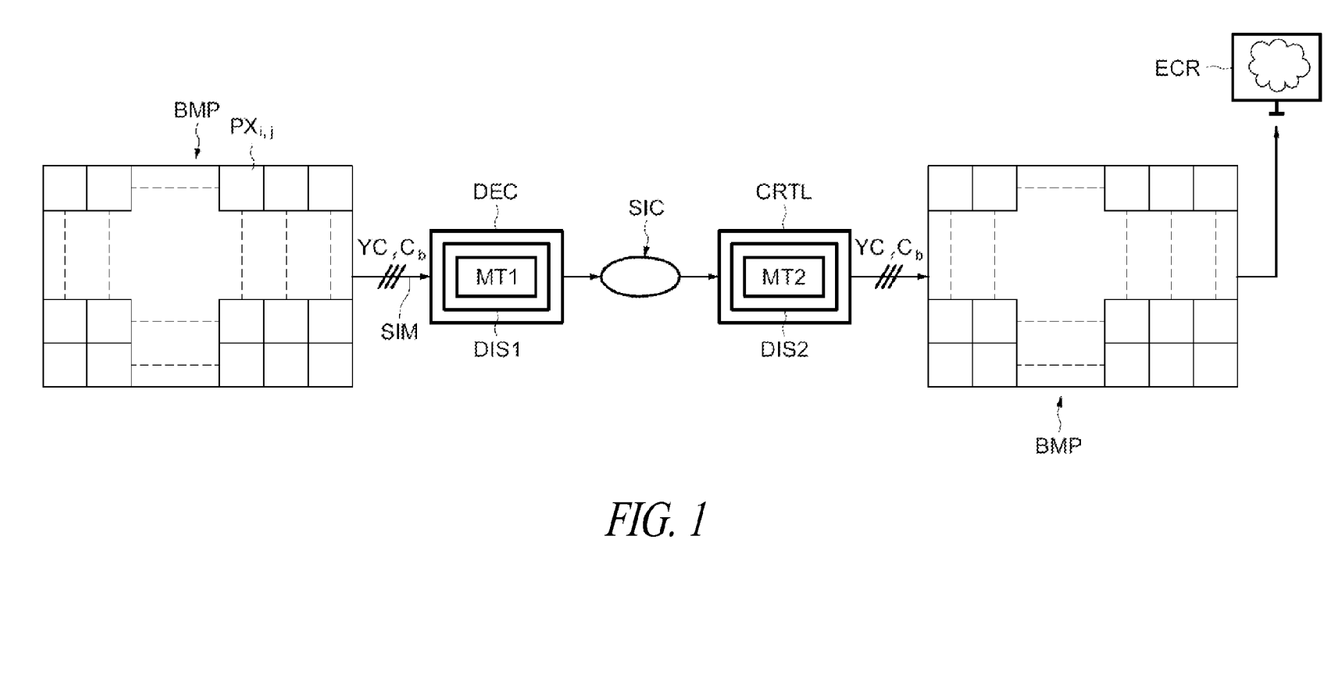
FIG. 1 is a schematic diagram of an image compression/decompression system according to one embodiment.

In FIG. 1, the reference DIS1 denotes a device for the compression of an image signal. The device DIS1 can be included in a video decoder DEC, for example a TV decoder according to the MPEG standards.

The device DIS1 receives an initial image signal SIM comprising a sequence BMP of pixels $PX_{i,j}$.

Each pixel is allocated with several digital color components, three color components in this case, namely a brightness component Y, a chrominance component Cr and another chrominance component Cb.

The sequence BMP of pixels can be a complete frame of the image stored in a video memory. As a variant, the pixels of the frame of the image can be delivered sequentially one by one and line by line ("raster" format). The pixels of the sequence can also be delivered macroblock by macroblock. In this case, the macroblocks are stored in a video memory and then processed by the device DIS1. When the pixels arrive sequentially, in a format of the raster type, they are also stored in a video memory in order to be subsequently processed by the device DIS1.

The device DIS1 comprises a processor MT1 for processing the image signal SIM and providing, for each color component, a distinct compressed image signal SIC, thereby obtaining a plurality of compressed image signals SIC corresponding respectively to the color components.

This image signal SIC is then delivered, for example via a wire link, to a screen controller CTRL comprising a decompression device DIS2. The signal SIC is processed by the processor MT2 which reconstitutes the sequence BMP of pixels allocated with three color components Y, Cr, Cb for the purpose of displaying the image on a screen ECR, for example the screen of a high definition television set.

The processors MT1 and MT2 can be embodied for example by specific printed circuits (ASIC) or by software modules within processors, it being possible for these software modules to be stored in program memories, for example of the read only memory (ROM, EEPROM, etc.) type.

There will now be described in greater detail, referring more particularly to FIG. 2 and the following figures, an example of a method for the compression of the image signal SIM according to the disclosure implemented by the processor MT1 of the compression device DIS1 included in the MPEG decoder DEC.

The color components allocated to the different pixels are processed independently, the steps used being identical for each of the color components. The processing carried out on the different color components can be done so sequentially or in parallel.

The following discusses the processing of the brightness component Y although corresponding steps occur for the other color components.

The sequence of pixels BMP therefore comprises a matrix of digital data representing, for the pixels of the sequence, the amplitudes of the color component Y.

Figure 2:
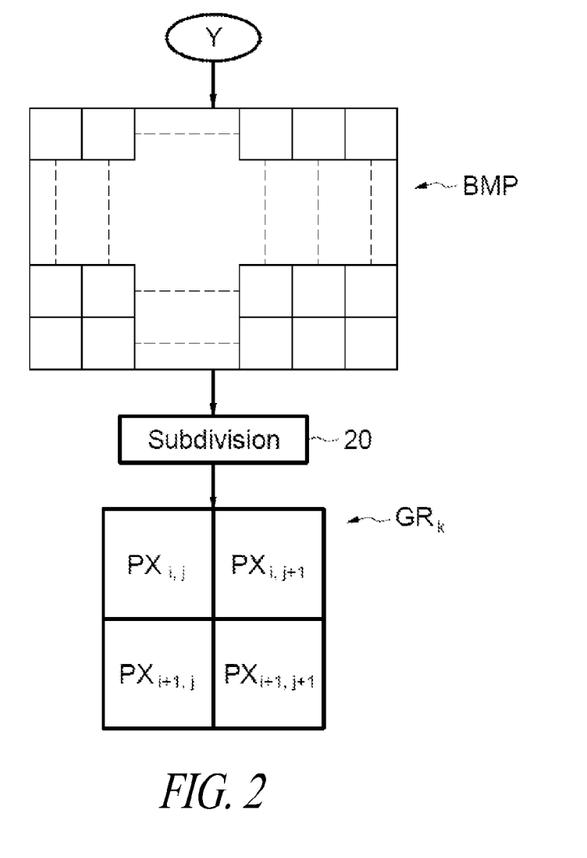
FIG. 2 is a schematic diagram showing a subdivision of an array of pixels into groups of pixels.

The sequence of pixels BMP is subdivided (step 20) into several groups $GR_k$ of several adjacent pixels, as shown in FIG. 2.

In the case where the group is a square zone of $2^p \times 2^p$ pixels, the minimum group is a group of 2×2 pixels respectively situated on two adjacent lines and two adjacent columns. It is of course possible to group the pixels in groups of larger size, for example groups of 4×4 pixels respectively distributed over four adjacent lines and four adjacent columns. The smaller the size of the group is, the lower the compression rate. Conversely, the bigger the group is, the higher the compression rate but, as will be seen in greater detail below, the greater the number of approximation parameters used is, the more visible are the quantification errors in the image. This being so, a group of 4×4 pixels is a good compromise which makes it possible to have a compression rate of about 2 with good restituted image quality, in particular for frames of 4 k×2 k pixels.

Of course, when the pixels of the sequence arrive sequentially one after the other and line by line, according to the raster format, one should, when groups of 4×4 pixels are used, firstly to store at least four lines of pixels before starting the subdivision step 20.

The color components can be encoded for example using 8, 10, 12 or even 24 bits.

Then, on each group $GR_k$, a normalization 30 (FIG. 3) of the amplitudes of the color component in question, in this case the color component Y, allocated to the pixels of the group is carried out.

Figure 3:
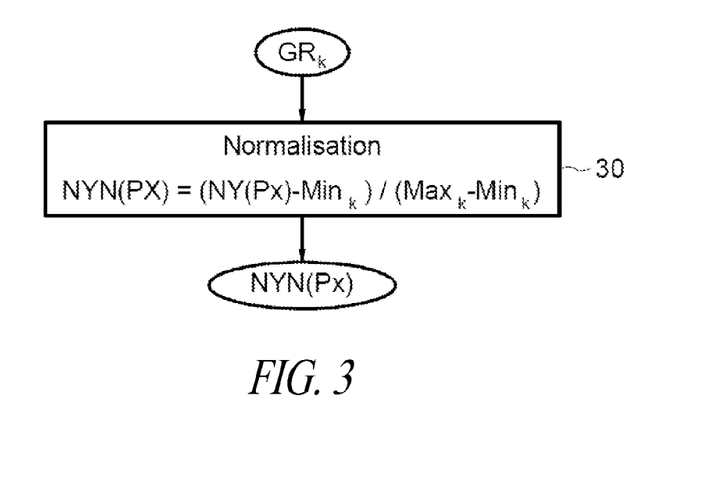
FIG. 3 is a schematic diagram showing a normalization of the groups of pixels.

More precisely, the normalized value NYN of the brightness Y of the pixel PX of the group can be given by the formula (1) below:

$$NYN=(NY-Min_k)/(Max_k-Min_k) \quad (1)$$

wherein:

NY denotes the initial value of the brightness Y of the pixel PX, $Min_k$ denotes the minimum value of the amplitudes of the color component Y of the group $GR_k$ and $Max_k$ denotes the maximum value of those amplitudes.

The normalized values of the color component are thus included between 0 and 1 and are typically encoded in eight bits.

Of course, even though the normalization has been applied in this case after the subdivision of the sequence of pixels into groups, this normalization could have been carried out directly on the sequence of pixels before the subdivision step 20.

In addition to the fact that this normalization step makes it possible to reduce the number of bits of the digital words representing the amplitudes of the color components of the pixels of the group, it also makes it possible to reduce the risk of appearance of a color banding phenomenon in the reconstituted image.

Figure 4:
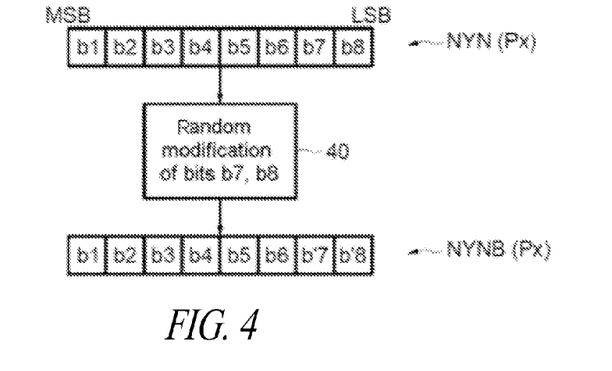
FIG. 4 is a schematic diagram showing the addition of random noise to the normalized amplitude of the color component.

In the next step (FIG. 4) the processor MT1 adds random noise to the normalized amplitude of the color component. In practice, as shown in FIG. 4, the addition of random noise to the eight-bit digital words NYN, consists for example in randomly modifying the value of the two least significant bits b7, b8 (step 40), in order to obtain a noisy word NYNB.

The addition of the noise is random or pseudo-random in the sense that the two least significant bits of the different digital words NYN are not modified in the same way for all of the digital words.

In practice this addition of noise does not modify the quality of the image because the first six bits of the digital word b1-b6 correspond to 36 visual dB and the last two bits of least significance correspond to modifications of the color component that are invisible to the eye. This being so, this addition of noise makes it possible to disperse the quantification error randomly in the approximation which will be carried out subsequently.

This addition of noise could of course be carried out before the normalization step.

The group $GR_k$ of pixels, even though this is not essential, is subdivided in this case into two interlaced sub-groups, each sub-group having a checkered pattern. Thus the sub-group 1, SGR1, in FIG. 5 comprises the white squares whilst the sub-group 2, SGR2, comprises the cross-hatched squares. The processing that the two sub-groups will undergo is identical and can be carried out sequentially or in parallel.

Figure 5:
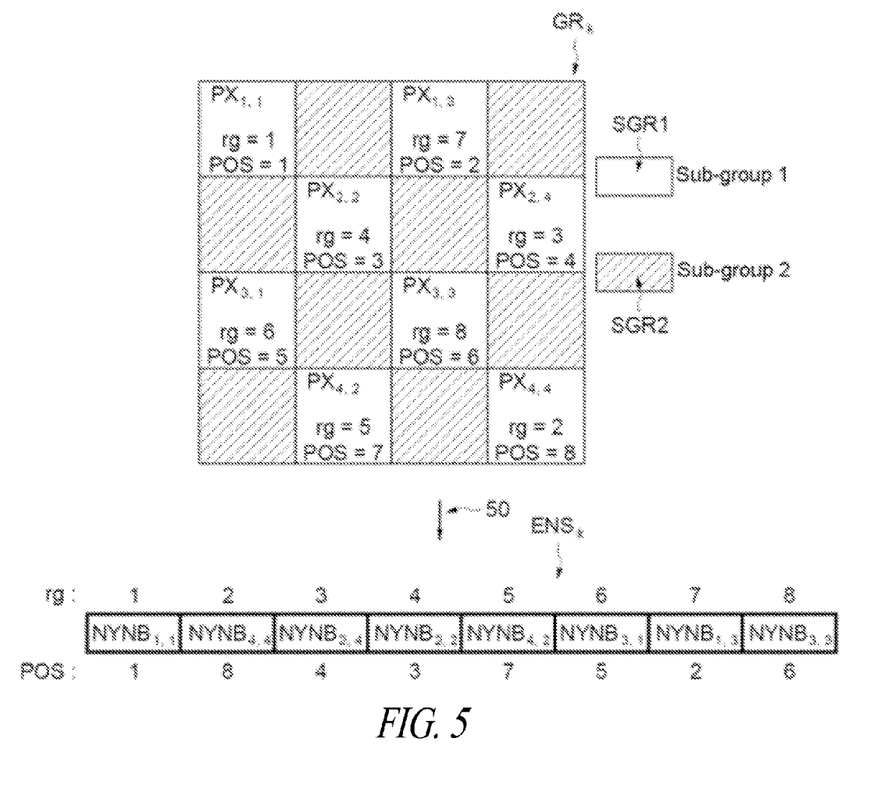
FIG. 5 is a schematic diagram showing a subdivision of a group of pixels into two interlaced sub-groups and a monotone sequencing of the pixels of one of the sub-groups.

Only the processing applied to the sub-group SGR1 will now be described.

Within the sub-group SGR1, the pixel $PX_{1,1}$ occupies the position POS=1, the pixel $PX_{1,3}$ occupies the position POS=2, the pixel $PX_{2,2}$ occupies the position POS=3. The pixel $PX_{2,4}$ occupies the position POS=4. The pixel $PX_{3,1}$ occupies the position POS=5. The pixel $PX_{3,3}$ occupies the position POS=6. The pixel $PX_{4,2}$ occupies the position POS=7 and the pixel $PX_{4,4}$ occupies the position POS=8.

Moreover, the normalized noisy value $NYNB_{i,j}$ of the component Y is allocated to the pixel $PX_{i,j}$.

Furthermore, as shown in FIG. 5, the processor carries out a monotone sequencing 50 of the pixels of the sub-group 1 according to the amplitude of their color component, in this case the component Y.

The sequencing is monotone but it can be increasing or decreasing.

In this example it is assumed that the sequencing is increasingly monotone from the lowest amplitude, in this case the amplitude $NYNB_{1,1}$ up to the highest amplitude, in this case the amplitude $NYNB_{3,3}$.

After this sequencing, the sequenced set $ENS_k$ is therefore obtained, within which the value $NYNB_{1,1}$ occupies position 1 and the value $NYNB_{3,3}$ occupies position 8.

It would of course have been entirely possible to carry out this sequencing on the whole of the group $GR_k$. This being so, the fact of working in this case on two independent sub-groups notably makes it possible to obtain a decorrelation of the approximation errors during the approximation of the amplitudes NYNB of the color component, which will now be described with reference to FIGS. 6 to 9.

Figure 6:
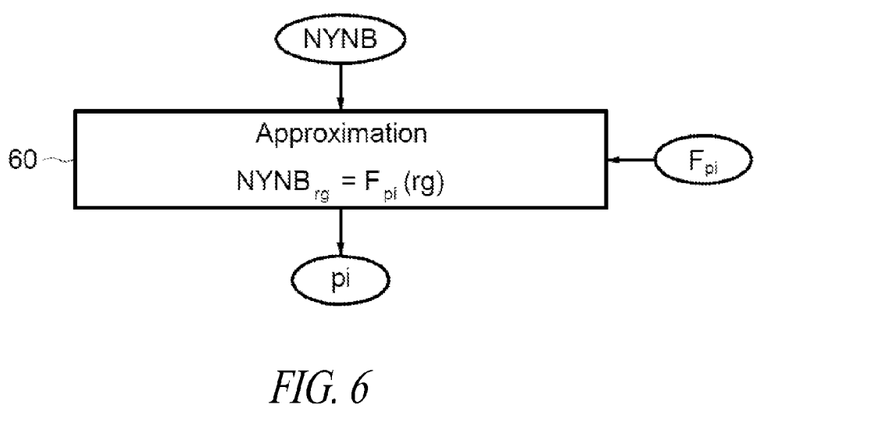
FIG. 6 is a schematic diagram showing an approximation of noisy amplitudes of the color component by a monotone approximation.

In general, as shown in FIG. 6, the processor MT1 carries out an approximation 60 of the noisy amplitudes NYNB of the color component Y of the pixels of the set $ENS_k$ by means of a monotone approximation function $F_{pi}$, with one variable, which in this case is the position rg of the sequenced pixels in the set $ENS_k$.

Moreover, the parameters pi of the approximation function are defined for each set $ENS_k$.

These parameters pi represent the characteristics of the approximation function associated with the set in question $ENS_k$.

In order to further improve the quality of the restituted image, the processor carries out an adjustment of these characteristics in order to minimize the mean error between the amplitudes of the color component in question allocated to the pixels of the set $ENS_k$ and the approximated amplitudes of that color component.

Moreover, this adjustment of the parameters is carried out for each set as a function of the values of the amplitudes of the color components in question.

Figure 7:
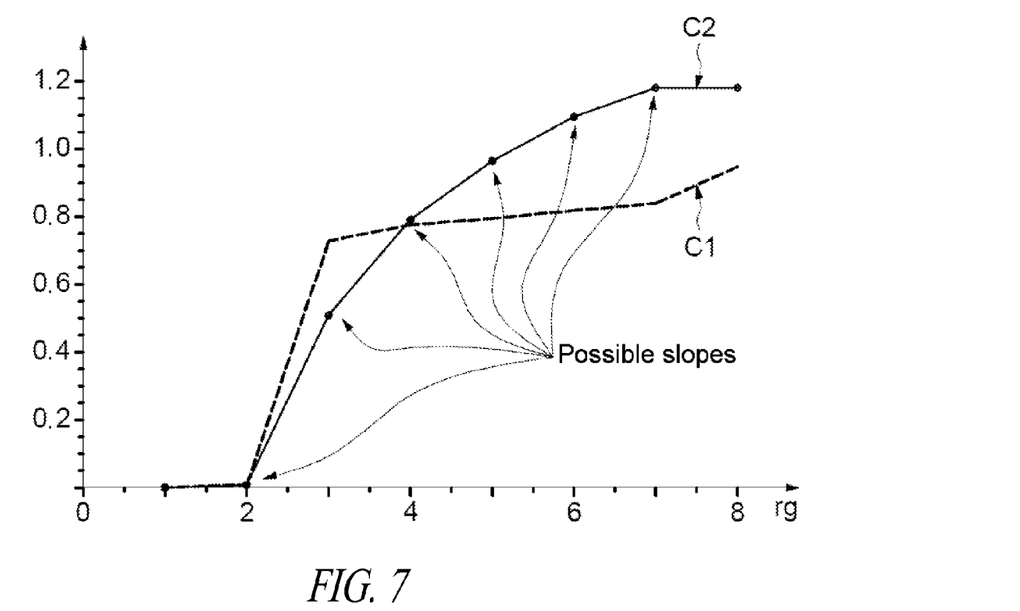
FIG. 7 depicts a curve C1 representing amplitudes of a color component as a function of the position of the pixels and a curve C2 showing the possible values of the slopes for the approximation of the curve C1, calculated from a pixel in position 1.
Figure 8:
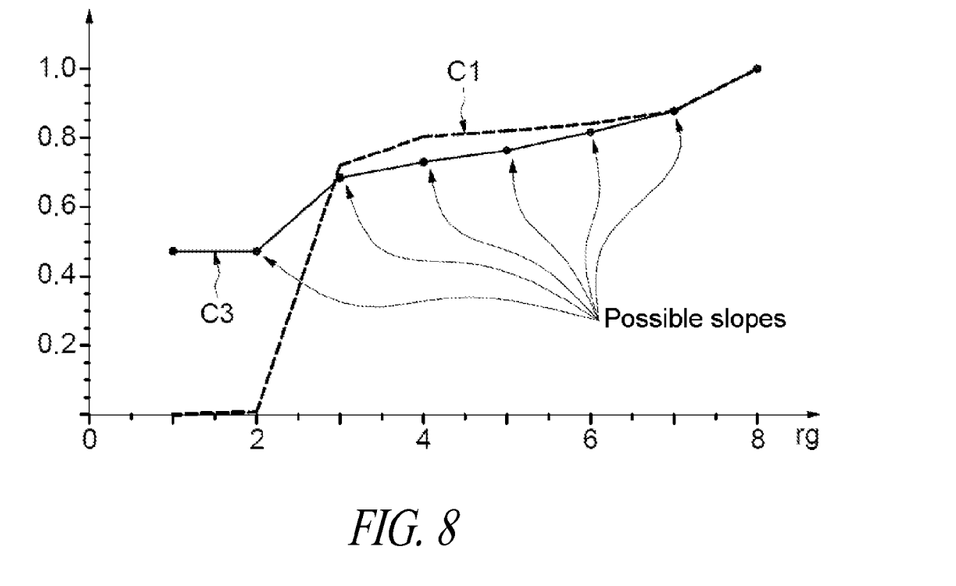
FIG. 8 depicts the curve C1 and a curve C3 representing possible values of slopes allowing the approximation of the curve C1, calculated from a pixel in position 8.
Figure 9:
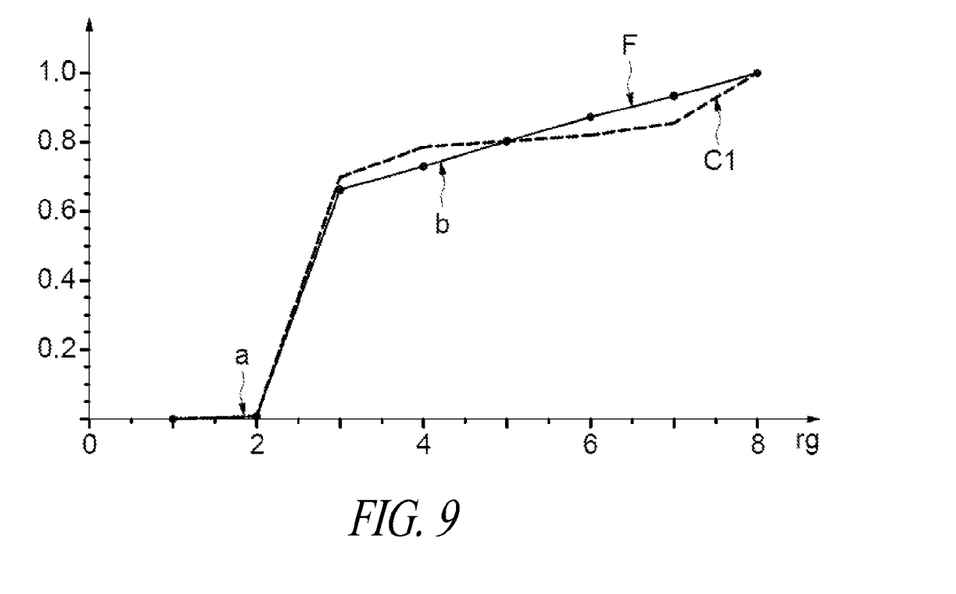
FIG. 9 depicts the curve C1 and an approximated by the function F formed by two slopes having the values a and b respectively.

This is shown more particularly in FIGS. 7 to 9.

Although the approximation function can be any monotone function, a polynomial function makes it possible to carry out such an approximation very simply.

This being so, as shown in FIGS. 7 to 9, this polynomial function can be formed from two first order polynomial functions as a function of the value of the positions of the pixels of the sequenced set.

More precisely, in FIG. 7, the curve C1 represents the evolution of the amplitudes of the brightness component Y of the pixels of the set $ENS_k$ as a function of the position rg of these pixels. The amplitudes vary from 0 for the pixel in position 1 to 1 for the pixel in position 8. The curve C2 shows the possible values of the slopes for the approximation of the curve C1, calculated from the pixel in position 1.

The curve C1 appears again in FIG. 8 and, this time, the curve C3 represents the possible values of slopes allowing the approximation of the curve C1, calculated from the pixel in position 8.

The result of this, as shown in FIG. 9, is that the curve C1 can be approximated by the function F in this case formed by two slopes having the values a and b respectively allocated to the pixels in positions 1 to rga and in positions rga+1 to n where n denotes the total number of pixels. More precisely, the value $NYNB_{rg}$ of the pixel in position rg can be defined by the formula (2) below:

$$NYNB_{rg}=a(rg-1) \qquad (2)$$

for all of the pixels whose positions rg vary from 1 to rga (rga=2 in this case).

Moreover, for all of the pixels whose positions vary from rga+1 to n (n=8 in the present case), the value $NYNB_{rg}$ can be defined by the formula (3) below:

$$NYNB_{rg}=1-b(n-rg) \qquad (3)$$

Such a function F minimizes the error between the approximated values $NYNB_{rg}$ and the values NYNB of the set $ENS_k$.

Figure 10:
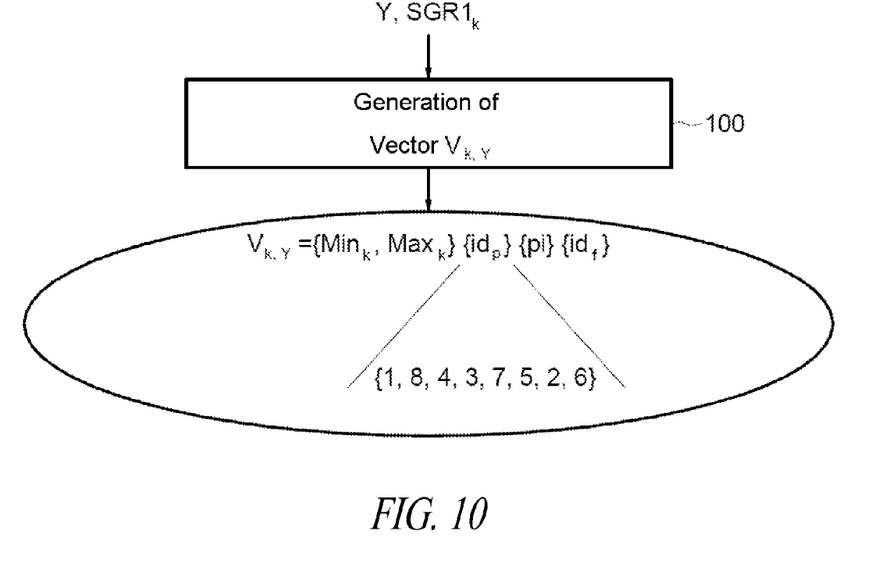
FIG. 10 is a schematic diagram showing a generation of a vector for the sub-group.

The processor MT1 then generates, for the sub-group $SGR1_k$ and for the brightness component Y, an item of information, or vector, $V_{k,Y}$ (step 100, FIG. 10). This item of information or vector comprises the minimum value $Min_k$ and the maximum value $Max_k$ of the color component of the pixels of the sub-group and the position indications idp of the sequenced pixels in the sub-group. These items of position information are thus, in this case, the series of numbers 1, 8, 4, 3, 7, 5, 2, 6. The vector $V_{k,Y}$ also comprises an indication idf relating to the shape of the sub-group in the group (in this case it is a checkered pattern), as well as the parameters pi of the approximation function F. In the present case, the vector $V_{k,Y}$ would comprise the two values a and b of the two slopes as well as the value rga.

In the case where the amplitudes of the color components are equal for all of the pixels of the sub-group, then of course no approximation is carried out and the possibly normalized value of these amplitudes is not transmitted.

By way of indication, if a group of 4×4 pixels is considered, with color components encoded in 10 bits, representing a total of 480 data bits, they can be compressed into 248 bits, which gives a compression ratio of about 2.

Figure 11:
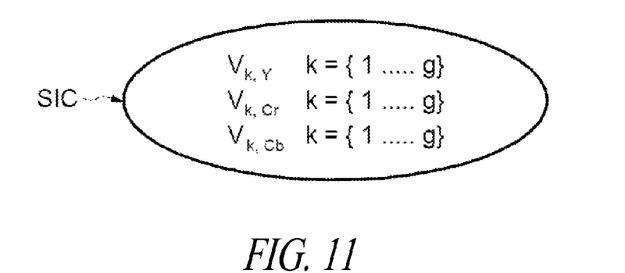
FIG. 11 depicts the compressed image signal SIC including vectors $V_{k,Y}$ for the brightness component Y, as well as the analog vectors $V_{k,Cr}$ for the chrominance component Cr and the vectors $V_{k,Cb}$ for the chrominance component Cb.

Moreover, as shown in FIG. 11, the compressed image signal SIC delivered by the processor MT1 comprises the vectors $V_{k,Y}$ for the brightness component Y and for all of the groups (k varying from 1 to g where g denotes the number of groups), as well as the analog vectors $V_{k,Cr}$ for the chrominance component Cr and the vectors $V_{k,Cb}$ for the chrominance component Cb.

The processor MT2 of the decompression device DIS2 of the controller CTRL then reconstitutes (step 120, FIG. 12) the sequence of pixels BMP from the compressed image signal SIC.

Figure 12:
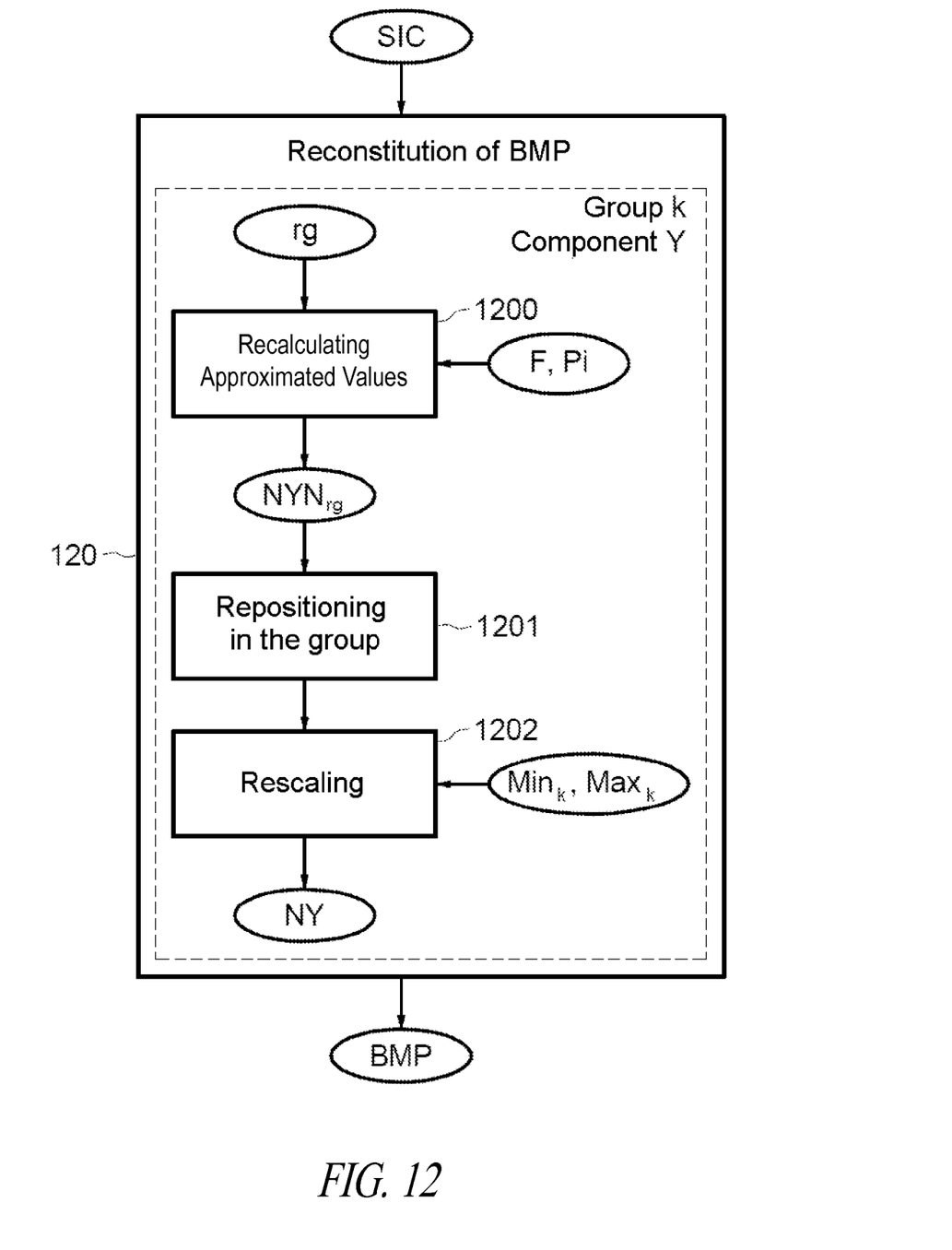
FIG. 12 is a schematic diagram showing a method of decompressing the compressed signal.

More precisely, for each group k or sub-group k, for each color component (Y for example), the processing means MT2 firstly recalculate (step 1200) the approximated values of the amplitudes $NYN_{rg}$ of the color component associated with the group or with the sub-group in question for the pixels of the corresponding sequenced set from the approximation function F and from the received parameters pi.

Then, on the basis of the shape indication idf of the possible sub-group and of the position indications idp, these recalculated approximated values are allocated to the corresponding pixels of the group (repositioning 1201) and, finally, the values of the amplitudes can be rescaled (1202) on the basis of the received values $\text{Min}_k$ and $\text{Max}_k$ by means of the following formula (4):

$$NY(PX)=NYN(PX)*(\text{Max}_k-\text{Min}_k)+\text{Min}_k \quad (4)$$

It would of course be entirely possible to reverse the order of the rescaling step 1202 and the repositioning step 1201.

The disclosure is not limited to the embodiments and implementations that have just been described but includes all variants.

Thus, although sub-groups having a checkered pattern have been described, it would be possible to use other types of sub-groups, for example groups of adjacent lines or groups of adjacent columns.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
compressing an initial image signal into a compressed image signal, the initial image signal including a sequence of pixels, each pixel being allocated with plural digital color components, for each color component the compressing including:
subdividing the sequence of pixels into several groups of several adjacent pixels,
for each group of at least a portion of the groups, generating a sequenced set of pixels associated with the group, the generating including monotonically sequencing the pixels of the group as a function of respective amplitudes of the color component of the pixels, and
generating approximations of the amplitudes of the color component of the pixels of the set using a monotone approximation function with one variable related to positions of the sequenced pixels in the set, wherein the compressed image signal includes, for each color component and for each group of pixels belonging to the at least one portion, an item of information including indications of position of the sequenced pixels in the group and characteristics of the approximation function associated with the group.

2. The method according to claim 1, comprising, for each color component, adjusting the characteristics of the approximation function associated with the set in such a way as to minimize a mean error between the color component amplitudes of the pixels of the set and the approximated amplitudes of that color component.

3. The method according to claim 1, wherein, for each color component, the approximation function is a parameterized function having parameters with values that are adjusted for each set according to the values of the amplitudes of the color component of the pixels of the set, the characteristics of the approximation function including the parameters.

4. The method according to claim 3, wherein the approximation function comprises a polynomial function.

5. The method according to claim 1, wherein, for each color component, generating the sequenced set of pixels associated with the group comprises normalizing the amplitudes of the color component of the pixels of the group, and the information associated with the group comprises a minimum value and a maximum value of the amplitudes.

6. The method according to claim 1, wherein, for each color component, generating the sequenced set of pixels associated with the group comprises adding pseudo-random noise on the amplitudes of the color component of the pixels of the group.

7. The method according claim 1, wherein, for each color component, the at least the portion includes groups having at least two amplitudes of the color component that are different.

8. The method according to claim 1, wherein the compressed image signal comprises, for a group, of the groups for one of the color components, having all amplitudes of the color that are identical, an indication of a value of that amplitude.

9. The method according to claim 1, wherein, for each color component, the sequence of pixels is a matrix of pixels and each group of pixels is a zone of 2 p×2 pv adjacent pixels, p and pv being integers.

10. The method according to claim 1, comprising, for each color component, subdividing the groups of pixels into sub-groups of pixels, wherein:
generating the sequenced set of pixels for each group of at least the portion of the groups includes generating a sequenced set of the pixels associated with one of the sub-groups;
generating approximations of the amplitudes of the color component of the pixels of the set, for each group of at least the portion of the groups and for each color component, includes generating approximations of amplitudes of the color component of the pixels of the set of the pixels associated with the one of the sub-groups; and
the information of the compressed image signal includes shape indications of the sub-groups.

11. The method according to claim 10, wherein, for each color component, the at least the portion of the groups includes groups having at least two amplitudes of the color component that are different.

12. The method according to claim 1, comprising decompressing the compressed image signal, the decompressing including for each color component and for each group of pixels, determining the amplitude of the color component of the pixels from the item of information.

13. A device, comprising:
a compression device configured to compress an initial image signal into a compressed image signal, the initial image signal including a sequence of pixels, each pixel being allocated with plural digital color components, the compression device including:
an input configured to the initial image signal;
a processor configured, for each color component, to:
subdivide the sequence of pixels into several groups of several adjacent pixels,
for each group of at least one portion of the groups, generate a sequenced set of pixels associated with the group from a monotone sequencing of the pixels of each group according to respective amplitudes of their color component of the pixels,
generate approximations of the amplitudes of the color component of the pixels of the set using a monotone approximation function with one variable related to positions of the sequenced pixels in the set; and
an output configured to deliver the compressed image signal, which includes, for each color component and for each group of pixels belonging to the at least one portion, information comprising indications of position of the sequenced pixels in the group and characteristics of the approximation function associated with the group.

14. The device according to claim 13, wherein the processor is configured, for each color component and for each group of pixels belonging to the at least one portion, to carry out an adjustment of the characteristics of the approximation function associated with the set for the group in order to minimize a mean error between the amplitudes of the color component of the pixels of the set and the approximated amplitudes of the color component.

15. The device according to claim 13, wherein, for each color component, the approximation function is a parameterized function having parameters and the processor is configured to adjust values of the parameters for each set as a function of the values of the amplitudes of the color component of the pixels of the set, the characteristics of the approximation function including the parameters.

16. The device according to claim 15, wherein the approximation function comprises a polynomial function.

17. The device according to claim 13, wherein the processor is configured, to for each color component and for each group of pixels belonging to the at least one portion, normalize the amplitudes of the color component of the pixels of the group and the information of the compressed image signal comprises a minimum value and a maximum value of the amplitudes for the group.

18. The device according to claim 13, wherein the processor is configured, for each color component and for each group of pixels belonging to the at least one portion, to add pseudo-random noise to the amplitudes of the color component of the pixels of the group.

19. The device according to claim 13, wherein, for each color component and for each group of pixels belonging to the at least one portion, the at least one portion includes groups having at least two amplitudes of the color component that are different.

20. The device according to claim 13, wherein the processor is configured to include, in the compressed image signal, for a group, of the groups for one of the color components, having all amplitudes of the color component that are identical, an indication of a value of that amplitude.

21. The device according to claim 13, wherein, for each color component, the sequence of pixels is a matrix of pixels and each group of pixels is a zone of 2p×2pv adjacent pixels, p and pv being integers.

22. The device according to claim 16, wherein the processor is configured to subdivide each group of pixels into subgroups of pixels, generate a sequenced set of the pixels associated with at least a portion of the sub-groups, and generate approximations of amplitudes of the color component of the pixels of the set of the pixels associated with the at least the portion of the sub-groups, the information of the compressed image signal including shape indications of the sub-groups.

23. The device according to claim 22, wherein, for each color component, the at least the portion includes sub-groups having at least two amplitudes of the color component that are different.

24. The device according to claim 13, comprising a decompression device configured to decompress the compressed image signal, the decompression device including a processor configured, for each color component and for each group of pixels, to determine the amplitude of the color component of the pixels from the information of the compressed image signal.

25. A non-transitory computer-readable medium having instructions configured to cause a data processing system to execute a method comprising:
  compressing an initial image signal into a compressed image signal, the initial image signal including a sequence of pixels, each pixel being allocated with plural digital color components, for each color component the compressing including:
  subdividing the sequence of pixels into several groups of several adjacent pixels,
  for each group of at least a portion of the groups, generating a sequenced set of pixels associated with the group, the generating including monotonically sequencing the pixels of the group as a function of respective amplitudes of the color component of the pixels, and
  generating approximations of the amplitudes of the color component of the pixels of the set using a monotone approximation function with one variable related to positions of the sequenced pixels in the set, wherein the compressed image signal includes, for each color component and for each group of pixels belonging to the at least one portion, an item of information including indications of position of the sequenced pixels in the group and characteristics of the approximation function associated with the group.

26. The non-transitory computer-readable medium of claim 25, wherein the method comprises:
  decompressing the compressed image signal, the decompressing including for each color component and for each group of pixels, determining the amplitude of the color component of the pixels from the item of information.

* * * * *